(12) United States Patent
Lvovich et al.

(10) Patent No.: US 7,723,252 B2
(45) Date of Patent: May 25, 2010

(54) CATALYSTS AND METHODS FOR SYNTHESIZING ALIPHATIC HYDROCARBONS FROM CO AND $H_2$

(75) Inventors: Lapidus Albert Lvovich, Moscow (RU); Budtsov Vladimir Sergeevich, Calgary (CA)

(73) Assignee: Wesco, Conroe, TX (US)

( * ) Notice: Subject to any disclaimer, the term of this patent is extended or adjusted under 35 U.S.C. 154(b) by 176 days.

(21) Appl. No.: 11/734,006

(22) Filed: Apr. 11, 2007

(65) Prior Publication Data
US 2007/0244206 A1    Oct. 18, 2007

(51) Int. Cl.
*B01J 29/06* (2006.01)
*C07C 27/06* (2006.01)

(52) U.S. Cl. .............. 502/66; 502/74; 502/77; 502/78; 502/79; 518/700; 518/715

(58) Field of Classification Search ............ 502/66, 502/74, 77, 78, 79; 518/700, 715
See application file for complete search history.

(56) References Cited

U.S. PATENT DOCUMENTS

| 4,472,518 | A | * | 9/1984 | Chu ........................ 502/77 |
| 4,491,637 | A | * | 1/1985 | Hartig et al. ............... 502/66 |
| 4,543,427 | A | * | 9/1985 | Hartig et al. ............. 568/342 |
| 4,652,538 | A | * | 3/1987 | Rabo et al. ................ 502/66 |
| 4,659,743 | A | * | 4/1987 | Rao et al. ................. 518/715 |
| 5,126,377 | A | * | 6/1992 | Bessell ..................... 518/714 |
| 2003/0166734 | A1 | * | 9/2003 | Krylova et al. ............. 518/715 |

* cited by examiner

*Primary Examiner*—Elizabeth D Wood
(74) *Attorney, Agent, or Firm*—Kelley Drye & Warren LLP

(57) ABSTRACT

There is disclosed in embodiments catalysts produced by a two-stage loading of a zeolite carrier with an aqueous solution of a cobalt compound, with drying in an air current after each loading. Methods using the catalysts to produce synfuel are disclosed.

37 Claims, No Drawings

US 7,723,252 B2

CATALYSTS AND METHODS FOR SYNTHESIZING ALIPHATIC HYDROCARBONS FROM CO AND $H_2$

CROSS-REFERENCE TO RELATED APPLICATIONS

This application claims benefit to Russian Federation Patent Application No. RU2006112015/04, filed Apr. 12, 2006 (inventors Lapidus Lvovich and Budtsov Sergeevich), from which priority is claimed, and the contents of which is incorporated in its entirety herein.

A portion of the disclosure within this document contains material that is subject to copyright protection. The copyright owner has no objection to the reproduction of copyright protected materials by any person that is doing so within the context of this patent document as it appears in the United States Patent and Trademark Office patent file or records, but the copyright owner otherwise reserves all copyright rights whatsoever.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

All references cited in this specification, and their references, are incorporated by reference herein where appropriate for teachings of additional alternative details, features, and/or technical background.

1. Field of the Invention

The invention pertains to the field of catalyst production, and in an embodiment more particularly, to the creation of improved cobalt-zeolite catalysts for the synthesis of hydrocarbons (synfuels), e.g. $C_5$-$C_{10}$ aliphatic hydrocarbons, with CO and $H_2$ Via Fischer-Tropsch chemistry.

2. Description of Related Art

Synfuel (synthetic fuel) is again becoming increasingly important existing readily-available petroleum stores are being rapidly depleted. It has been known for some time that carbonaceous materials, such as coal, shale oil, or biomass, can be converted by pyrolytic gasification with steam to produce "syngas," a mixture of CO and $H_2$. One method for converting such syngas into hydrocarbons is the Fischer-Tropsch process invented by German researchers Franz Fischer and Hans Tropsch in the 1920's. The original Fischer-Tropsch process may be described as such:

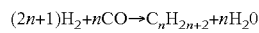

$$(2n+1)H_2 + nCO \rightarrow C_nH_{2n+2} + nH_2O$$

The use of Fischer-Tropsch chemistry in the conversion of syngas has been touted as a means to meet fuel needs in petroleum-poor countries.

A major fraction of the hydrocarbons typically produced by Fischer-Tropsch chemistry contain between 5 and 10 carbon atoms ($C_5$-$C_{10}$) in an aliphatic chain. These hydrocarbons can be used directly, for example, as components of motor fuels or as feedstocks for further chemical modification. It is often desirable to produce hydrocarbons with a high fraction of isoparaffins, because these branched compounds improve the octane rating of the synfuels.

Fischer-Tropsch chemistry typically employs catalysts to aid in the conversion of syngas to hydrocarbons. Published procedures exist for generating a catalyst for synthesizing hydrocarbons, in particular $CD_5$-$C_{10}$ aliphatic hydrocarbons, from "synthesis gas" that is, CO and $H_2$.

In one procedure described at [1] in the references cited below, the catalyst may be obtained by the combination of basic cobalt carbonate with a pentacil-type zeolite substrate, such as zeolite ZMS-5. A drawback of this described method for some may be the relatively low selectivity for isoparaffin formation. As indicated in [1], the content of isoparaffin hydrocarbons obtained by such a catalyst may not typically exceed 43%.

In another procedure described at [0002] for generating a catalyst for the synthesis of $C_5$-$C_{10}$ aliphatic hydrocarbons from CO and $H_2$, a zeolite carrier is suspended in a solution of cobalt nitrate, mixed in vacuum, dried by microwave heating, and subsequently baked at 500° C. A potential drawback of the method set forth in [2] is that it may be technically difficult to execute.

Another Fischer-Tropsch catalyst formation procedure, which is described by one of the present inventors, is set forth at [3] by Lapidus et al. In this case the zeolite-carrier is loaded with a solution of dicobaltoctacarbonyl in n-hexane. This mixture is subsequently processed with $H_2$ at 150° C. The drawback of this method is the low activity of the catalyst obtained. When used in a flow reactor the output of liquid hydrocarbons may not exceed 37 g/s from 1 $m^3$ of the synthesis gas passing through the system. The catalyst also may show low selectivity for forming isoparaffin hydrocarbons; with failure to exceed 44% of the reaction mixture [3].

As described above, there exists a need for higher-activity, higher-selectivity catalysts for synthesizing synfuels from syngas, as well as a need for providing synfuels with high isoparaffin content.

These needs may be met by embodiments of the invention described herein. In one embodiments there is zeolite-carriers subjected to a two-stage saturation with an aqueous solution of cobalt nitrate, with an intermediate step of drying in an air current at temperatures of about 350° C. to about 450° C. Subsequent drying on a water bath optionally may complete the catalysts. The need for fuels for high isoparaffin content may be met by synthesizing liquid hydrocarbons from CO and $H_2$ using the new catalysts via embodiment methods described below.

DEFINITIONS

The following definitions are pertinent to the disclosure.

By "catalyst" it is meant a substance or compound that when added to the reaction mixture increases the rate of a chemical reaction without itself being substantially consumed. One knowledgeable in the art will recognize, that as a practical matter, industrial catalysts have a finite lifetime, and will degrade slowly over time.

The term "Fischer-Tropsch (FT) chemistry" refers to the catalyzed combination of carbon monoxide (CO) and molecular hydrogen ($H_2$) to produce hydrocarbons of various forms. These hydrocarbons are commonly used as synthetic fuel otherwise known as synfuel.

By the term "synthesis gas" it is meant a mixture of CO and $H_2$ produced in one method by reacting a carbonaceous substance with steam at elevated temperature.

By "aliphatic hydrocarbons" we mean compounds containing linear or branched chains of carbon atoms. As typically referenced herein, the compounds will additionally contain mainly hydrogen atoms as additional substituents By "$C_5$-$C_{10}$ isoparaffin hydrocarbons" it is meant branched aliphatic hydrocarbons containing only carbon and hydrogen. Their molecular formula may be generally represented by the equation $C_nH_{2n+2}$ in which the subscript n ranges from 5 to 10.

By the term "benzine fraction" it is meant to refer to a fraction of liquid hydrocarbons obtained form petroleum as a distillate, comprising typically $C_5$-$C_{10}$ hydrocarbons.

With respect to the flow of gas in a flow reactor containing a catalyst, we use the term "volume velocity"; volume velocity is calculated by dividing the flow rate of the gas (g/hour) by the mass (g) of catalyst in the reactor bed. This quantity hour$^{-1}$.

By common usage, "zeolites" are aluminosilicate minerals, synthetic or naturally occurring, that have a micro-porous structure of molecular dimensions. The micro-porous structure typically is a repetitive system of interconnected cages and channels. As used herein, zeolites are heterogeneous catalysts used as "carriers" for, as described herein, for example, cobalt compounds.

By "carrier" it is meant a solid substrate for binding and supporting other substances. In an embodiment described herein, cobalt compounds deposited from aqueous solution onto a carrier. The process of binding the cobalt compounds may be termed "saturation," implying that a majority of the zeolitic binding sites are thereby occupied by these compounds.

When treated with acid, zeolites convert to their "H-form"; with this conversion, the H-forms typically act as strong acids, with increased catalytic efficiency compared to their original forms.

"Zeolite-Y" is a synthetic analog of the mineral faujasite with a silica-to-alumina ratio of about 6. The Zeolite-Y structure is a three-dimensional array of spherical supercages roughly 13 Å in diameter. These spheres are interconnected.

"Zeolite ZSM-5" is an acidic aluminosilicate zeolite with a higher silica and lower alumina content, with the ratio of silica to alumina typically being about 60 as used herein.

When describing a physical mixture of a solid zeolite and a saturating aqueous solution of a solute, such has cobalt nitrate hexahydrate, we describe the relative concentration of zeolite by dividing the mass of the dried zeolite in the mixture by the molarity (mole/liter) of the saturating solution and then multiplying by the volume of the saturating solution. This is the "mass/mole ratio". Thus, if a saturating solution is made by dissolving 29.3 (0.100 mole) of cobalt nitrate hexahydrate (formula weight 293.0 g/mole) in 100 milliliters of water (0.100 liter), the concentration of solute is 1.00 mole/liter. If this mixed with 20 grams of dried zeolite, the relative concentration is defined to be (20 g/1.00 mole/liter)×0.100 liter=2.0 g-liter/mole. The measure refers to these quantities before mixing. Note that this measure does not account for volume changes produced by adding a liquid to a solid.

In this application, we refer to quantities that may have acceptable but differing amounts of variability. For instance we use the term "about X grams". By the term "about," it is meant roughly +/−10% of the value of that quantity. Thus, "about 100 grams" would implicitly mean a quantity roughly varying in the range of 90 to 110 grams.

SUMMARY

Embodiments disclosed herein include:

A first embodiment method for producing zeolite catalysts, said method comprising the steps of: (a) obtaining a zeolite; (b) impregnating the zeolite with a cobalt compound in solution; (c) drying the impregnated zeolite of step (a) to remove the solution in which the cobalt compound was impregnated from the impregnated zeolite; and (d) repeating steps (b) and (c), in order, at least one time.

The zeolite used in the first embodiment method may be selected from at least one of zeolite types of the group consisting of: pentacil-type zeolites, acidic aluminosilicate zeolites, and synthetic analogs of the mineral faujasite zeolites. For instance the zeolite that is selected may be Zeolite-Y and/or Zeolite ZMS-5. The solution in which said cobalt compound is found may be an aqueous solution, such as one comprising or consisting of water. The cobalt compound impregnated into the zeolite may be selected from at least one of the groups consisting of: a cobalt salt, cobalt nitrate and cobalt nitrate hexahydrate. The drying step of step (c) may comprise exposing the impregnated zeolite to an air stream which may have a temperature of between about 200° C. to about 600° C., or about 300° C. to about 500° C., or about 350° C. to about 450° C. The drying step (c) may comprise baking the impregnated zeolite at a temperature of between 200° C. to about 600° C., or between about 300° C. to about 500° C., or between about 350° C. to about 450° C. with or without current air flow, for, for example, at least 3 hours or at least 5 hours. The drying step of step (c) may further comprise, or alternatively comprise, drying the impregnated zeolite on a water bath at a temperature of between about 30° C. to about 100° C., or between about 60° C. to about 80° C., for at least 30 minutes, or at least about 1 hour.

A second embodiment method for producing zeolite catalysts comprising in order the steps: (a) drying a zeolite in H-form for about at least 3 hours at about at a temperature of about 200° C. to about 600° C. under an air stream; (b) saturating the dried zeolite with an aqueous solution of cobalt nitrate hexahydrate; (c) drying the saturated zeolite for about at least 3 hours at about at a temperature of about 200° C. to about 600° C. under an air stream; (d) re-saturating the zeolite of step (c) with an aqueous solution of cobalt nitrate hexahydrate; and (e) drying the saturated zeolite for about at least 3 hours at about at a temperature of about 200° C. to about 600° C. under an air stream.

In the second embodiment method, the saturation steps may produce a mass/mole ratio of between about 0.43 and 0.14 g/mole. The method may also include the additional step of: drying the saturated zeolite on a water bath at a temperature of between about 30° C. to about 100° C. for at least about 1 hour, such step being performed before or any or all of drying steps (c) or (e). The drying steps of (c) and (e) may be conducted with an air stream at a temperature, for example of between about 350° C. and about 450° C. for about 5 hours to produce a powder. If water bath drying is employed, the water bath temperature may be maintained at about 60° C. for about 1 hour. The mass/mole ratio of the solution—zeolite mixture may be in advantageous embodiments, about 0.43, about 0.22, or about 0.14.

Zeolites useful in the embodiment methods 1 and 2, include (without limitation) and Zeolite Y and Zeolite ZSM-5. Of course, also included in the disclosure is the zeolite-cobalt products of such methods.

A third embodiment method, encompasses a method or producing synfuel, the steps of such method comprising in order: (a) obtaining a zeolite-cobalt catalyst made by the method of claim 1; (b) activating the zeolite catalyst by heating it in a flow reactor at a temperature of about 450° C., using a stream of hydrogen gas at about 1 atmospheric pressure with a volume velocity of about 3000 hours$^{-1}$; (c) stopping the hydrogen flow and reducing the temperature of the flow reactor to about 160° C.; (d) passing synthesis gas comprising CO/H$_2$ in the ratio of about ½ through the reactor with a volume velocity of about 100 hour$^{-1}$; (e) raising the temperature of the flow reactor to about 200° C. over a period of about 5 hours; and (f) collecting the gaseous and liquid products.

DETAILED DESCRIPTION OF REPRESENTATIVE EMBODIMENTS

Among embodiments disclosed herein, is a method of preparing a zeolite carrier catalyst, the method comprising the at least one step of saturating by impregnation of a zeolite carrier with an aqueous solution of a cobalt compound, with drying, advantageously in an air current, of the zeolite. Advantageously, multiple saturation/impregnation steps are performed. For example, the multi-step process may comprise a two-stage saturation/impregnation, or more than a two-stage saturation/impregnation, such as three or more. After each saturation/impregnation step drying is preformed. Drying of the zeolite between impregnation/saturation steps may include, for example, baking the saturated/impregnated zeolite in an air current or directing a heated air current at the zeolite. Advantageous baking temperatures may be about 200° C. to about 600° C., or about 250° C. to about 550° C., or about 300° C. to about 500° C., or about 350° C. to about 450° C. Baking times, and/or exposure to the drying air current, may advantageously range, for example, from at least about 1 hour, at least about 3 hours to at least about 5 hours. Drying between steps may also include drying on a water bath, for example at a temperature of between about 30° C. to about 100° C., or about 50° C. to about 9° C., or about 60° C. to about 80° C., or about 60° C. to about 70° C. Drying times on the water bath may advantageously range, for example, at least about 15 minutes, at least about 30 minutes, or at least about 1 hour. Following the last saturation/impregnation with the aqueous cobalt compound solution and subsequent drying, which may include baking as in the intermediate step(s), further drying of the cobalt compound impregnated zeolite may be undertaken, as for example by further drying over a water bath. Zeolites may also be dried prior to saturation/impregnation, again, for example, using an air current having a temperature of about 200° C. to about 600° C., or about 250° C. to about 550° C., or about 300° C. to about 500° C., or about 350° C. to about 450° C.

The aqueous saturation/impregnation solution may comprise a water solution of the cobalt compound, wherein the cobalt compound may be alone or with other compounds. The cobalt compound may comprise, for example, a cobalt salt, such as cobalt nitrate hexahydrate.

Particularly useful zeolites in such embodiment process include, without limitation, pentacil-type zeolites or acidic aluminosilicate zeolites, such as zeolite ZMS-5, and synthetic analogs of the mineral faujasite, such as Zeolite-Y.

Zeolites prepared by such embodiment method have been found to be significantly more active and selective with respect to the formation of isoparaffin hydrocarbons when Fisher-Tropsch chemistry is used in the conversion of carbon monoxide and hydrogen to hydrocarbons, particularly aliphatic hydrocarbons, more particularly $C_5$-$C_{10}$ aliphatic hydrocarbons.

There is also disclosed herein a method for producing synfuel comprising: (a) obtaining a zeolite-cobalt catalyst made by any of the embodiment methods described herein; (h) activating the zeolite catalyst by heating it in a flow reactor at a temperature of about 250° C. to about 650° C., or about 300° C. to about 600° C., or about 400° C. to about 500° C., for example about 450° C., using a stream of hydrogen gas at about 0.5 to about 2 atmospheric pressure, or about 1 atmospheric pressure, with a volume velocity of about 500 hour$^{-1}$ to about 5000 hour$^{-1}$, 1000 hour$^{-1}$ to about 5000 hour$^{-1}$, 1000 hour$^{-1}$ to about 5000 hour$^{-1}$, 2000 hour$^{-1}$ to about 4000 hour$^{-1}$, or about 3000 hour$^{-1}$; (c) stopping the hydrogen flow and reducing the temperature of the flow reactor from about 100° C. to about 300° C., from about 150° C. to about 200° C., or about 160° C.; (d) passing synthesis gas comprising CO/H$_2$ in the ratio of about ⅙ to about ⅚, or about ¼ to about ¾, or about ½ through the reactor with a volume velocity of about 100 hour$^{-1}$; (e) raising the temperature of the flow reactor to about 100° C. to about 400° C., or about 150° C. to about 300° C., or about 200° C. over a period of about 1 to about 8 hours, about 3 to about 6 hours, or about 5 hours; and (f) collecting the gaseous and liquid products.

In one embodiment, the H-forms of Zeolite Y and ZSM-5 are used, the physical and chemical characteristics of which are listed in table 1.

TABLE 1

Physical and Chemical Characteristics of Select Zeolites

| Characteristic | Zeolite Y | Zeolite ZSM-5 |
|---|---|---|
| Volatile Matter, Mass. % | 23.4 | 12.3 |
| Average Density g/cm$^3$ | 0.33 | 0.43 |
| Average particle size, micrometers | 5 | 14 |
| Average pore diameter, A | 31 | 30 |
| Specific volume of the pores, cm$^3$/gm | 0.34 | 0.18 |
| Specific Surface, m$^2$/g | 760 | 414 |
| Ratio of SiO$_2$/Al2O$_3$, mole/mole | 5.7 | 60 |
| Extent of Crystallization, % | 75 | 90-95 |

In such H-form Zeolites can be dried in an air stream for use, for example, an air stream at about 350° C.-550° C., or about 400° C. to about 500° C., or about 450° C., for 2-8 hours, for example about 5 hours.

EXAMPLE 1

Dried Zeolite Y, taken in amount of 29.1 grams, is saturated with the solution of 18 g cobalt nitrate hexahydrate in 30 milliliters of distilled water (2.05 Molar). The mass/molar ratio of Zeolite Y/Cobalt nitrate hexahydrate at this stage is 0.426 g/mole. The mixture is then dried on a water bath at the temperature of 60° C. for one hour, after which it is placed into a quartz reactor, heated by an electrical oven. A weak flow of air at 200° C. was passed through the reactor for 5 hours. The resultant powder is then removed from the reactor and saturated as before with the same solution of cobalt nitrate hexahydrate. It is then dried on the water bath at 60° C. for an hour. A catalyst of the following weight ratio is obtained: (Co)/(Zeolite Y)=20/80. Such a catalyst containing Zeolite Y and cobalt is referenced as a "Zeolite Y-Cobalt Catalyst" (example 1 in Table 2 below)

EXAMPLE 2

A catalyst (example 2 in Table 2 below) is obtained by the method described in Example 1, but heating of the sample after the first saturation is performed at a temperature of 350° C.

EXAMPLE 3

A catalyst (example 3 in Table 2 below) is obtained by the method described in Example 2, but Zeolite ZSM-5 is used as the carrier. Catalysts containing Zeolite ZSM-5 cobalt are referenced as a "Zeolite ZSM-5-Cobalt Catalysts".

EXAMPLE 4

A catalyst (example 4 in Table 2 below) is obtained by the method described in Example 1, however heating of the sample after the first saturation is conducted at a temperature of 450° C.

EXAMPLE 5

A catalyst (example 5 in Table 2 below) is obtained by the method described in Example 4, however, the zeolite ZSM-5 is used as the carrier.

EXAMPLE 6

A catalyst (example 6 in Table 2 below) is obtained by the method of Example 1, however, heating of the sample after the first saturation was conducted at a temperature of 500° C.

EXAMPLE 7

A catalyst (example 7 in Table 2 below) is obtained by the method of Example 6, however, Zeolite ZSM-5 is used as the carrier

EXAMPLE 8

20 g of baked Zeolite ZSM-5 are saturated with a solution of 8.7 grams of cobalt nitrate hexahydrate in 18 milliliters of distilled water (1.65 Molar). The mass/mole ratio of Zeolite ZSM-5/Cobalt nitrate hexahydrate at this stage is 0.218 g/mole It is then dried on a water bath at a temperature of 60° C. for about 1 hour, after which it is placed into a quartz reactor, heated by an electrical oven. A weak flow of air at 500° C. is directed to pass through the reactor for 5 hours. The resultant powder is then extracted from the reactor and saturated as before with the same solution of cobalt nitrate hexahydrate in water. It is then dried on a water bath at 60° C. for 1 hour. The catalyst of the following weight ratio is obtained: (Co)/(Zeolite ZSM5)=15/85 (example 8 in Table 2 below).

EXAMPLE 9

25 grams of baked Zeolite ZSM-5 are saturated with a solution of 20.6 grams of cobalt nitrate hexahydrate in 20 milliliters of distilled water (3.52 Molar). The mass/mole ratio of Zeolite Y/Cobalt nitrate hexahydrate at this stage is 0.142 g/mole. The mixture is then dried on a water bath at the temperature of 60° C. for 1 hour, after which it is placed into a quartz reactor, heated by an electrical oven. A weak flow of air at 500° C. passes through the reactor for 5 hours. The resultant powder is then extracted from the reactor and saturated as before with the same solution of cobalt nitrate hexahydrate in water. It is then dried on the water bath at 60° C. for an hour. The catalyst of the following weight ratio is obtained: (Co)/(zeolite ZSM5)=25/75 (example 9 in Table 2 below).

EXAMPLE 10

Zeolites prepared by a two-stage saturation/impregnation with the cobalt compound solution may be compared with a Zeolite prepared with a single saturation/impregnation of the zeolite carrier with a drying occurring after saturation/impregnation.

Comparison zeolites may be prepared by means of a single saturation of the zeolite carrier with subsequent drying on a water bath at a temperature of 60° C. (samples 10, 11 in Table 2), as well as with a single saturation of the carriers, with subsequent drying on the water bath under the temperature of 60° C. and then baking under 450° C. for 5 hours (samples 12, 13 in Table 2). Comparison catalysts consist of 20 parts Co and 80 parts zeolite.

Prepared samples of the catalysts are pressed into tablets, crushed into fractions of 2 cm³ to 3 cm³ and tested in Fischer-Tropsch synthesis. Such synthesis may be conducted in the open-flow configuration with a tubular quartz reactor of the tubular kind. The catalysts are activated immediately prior to the test by passing a flow of hydrogen through the reactor. The flow is passed with the volume velocity of 3000 h$^{-1}$, with atmospheric pressure and temperature of 450° C. for one hour. The synthesis of hydrocarbons is conducted under atmospheric pressure, by passing the synthesis gas comprised of CO/H$_2$=1:2, with the volume velocity of 100 h$^{-1}$ through the reactor. The temperature of synthesis is raised from 160° C. to 200° C. at the rate of five ° C. every 5 hours of work. Gaseous and liquid products of the synthesis are analyzed, using gas chromatography.

Exemplar results following such procedure are shown in Table 2. The results demonstrate that the introduction of cobalt nitrate hexalhydrate in two stages increases the catalyst's isomeric selectivity, measured by the enhanced production of branched, isoparaffin hydrocarbons. Additionally, the fraction of the heavy hydrocarbons greater than or equal to C$_{11}$ is decreased in the reaction mixture, as compared to samples prepared with single-stage saturation. The activity and selectivity of the samples prepared with double-stage saturation is also dependent on the intermediate baking temperature, with the preferred temperature being in the range of 350° C. to 450° C.

TABLE 2

Test results of the Co-zeolite catalysts in the synthesis of hydrocarbons from CO and H$_2$.
Test conditions: pressure 1 atm, temperature 200° C., volume velocity of the synthesis gas supply 100 h$^{-1}$.

| Example | Catalyst Formula | Saturation Method | Intermediate Baking Temperature (° C.) | Conversion of CO (%) | Total Hydrocarbon Production* | Fraction of C$_5$-C$_{10}$ Hydrocarbons Produced (%) | C$_{11}$ and Higher MW Hydrocarbons Produced (%) | Isoparaffin Hydrocarbon Fraction (Mass %) |
|---|---|---|---|---|---|---|---|---|
| 1 | 20 Co:80 Y | Double-stage | 200 | 35 | 77 | 51 | 4 | 69 |
| 2 | 20 Co:80 Y | Double-stage | 350 | 44 | 94 | 65 | 2 | 78 |
| 3 | 20 Co:80 ZSM-5 | Double-stage | 350 | 43 | 101 | 50 | 3 | 70 |
| 4 | 20 Co:80 Y | Double-stage | 450 | 42 | 92 | 65 | 1 | 81 |
| 5 | 20 Co:80 ZSM-5 | Double-stage | 450 | 45 | 102 | 52 | 2 | 69 |

TABLE 2-continued

Test results of the Co-zeolite catalysts in the synthesis of hydrocarbons from CO and $H_2$.
Test conditions: pressure 1 atm, temperature 200° C., volume velocity of the synthesis gas supply 100 $h^{-1}$.

| Example | Catalyst Formula | Saturation Method | Intermediate Baking Temperature (° C.) | Conversion of CO (%) | Total Hydrocarbon Production* | Fraction of $C_5$-$C_{10}$ Hydrocarbons Produced (%) | $C_{11}$ and Higher MW Hydrocarbons Produced (%) | Isoparaffin Hydrocarbon Fraction (Mass %) |
|---|---|---|---|---|---|---|---|---|
| 6 | 20 Co:80 Y | Double-stage | 500 | 37 | 89 | 60 | 1 | 79 |
| 7 | 20 Co:80 ZSM-5 | Double-stage | 500 | 47 | 108 | 55 | 2 | 65 |
| 8 | 15 Co:85 ZSM-5 | Double-stage | 500 | 41 | 96 | 51 | 1 | 63 |
| 9 | 25 Co:75 ZSM-5 | Double-stage | 500 | 54 | 122 | 67 | 4 | 61 |
| 10 | 20 Co:80 Y | Single-stage | — | 41 | 90 | 64 | 5 | 73 |
| 11 | 20 Co:80 ZSM-5 | Single-stage | — | 44 | 99 | 54 | 7 | 57 |
| 12 | 20 Co:80 Y | Single-stage | 450** | 24 | 41 | 28 | 3 | 77 |
| 13 | 20 Co:80 ZSM-5 | Single-stage | 450** | 27 | 43 | 31 | 3 | 64 |

*($g/m^3$ of the passing synthesis gas).
**Drying after a single-stage saturation.

Statement Regarding Preferred Embodiments

While the invention has been described with respect to preferred embodiments, those skilled in the art will readily appreciate that various changes and/or modifications can be made to the invention without departing from the spirit or scope of the invention as defined by the appended claims. One skilled in the art will also recognize that precise compositions, structures, and mechanisms of catalysis of the disclosed catalysts is yet unknown, and that the catalysts are most suitably defined by their processes of production.

REFERENCES CITED

1. A. L. Lapidus, A. U. Krylova, N. E. Varivonchik, V. M. Kapustin, H. C. Jem, Petrochemistry, 1985, 25, (5), 640.
2. S. Bessel, U.S. Pat. No. 5,126,377. Jun. 13, 1992.
3. A. L. Lapidus, H. C. Jem, A. U. Krylova, Academy of Sciences, Ser. Chemistry, 1983, 148.

We claim:

1. A method for producing zeolite catalysts, said method comprising the steps of:
   (a) obtaining a dried/baked zeolite;
   (b) impregnating said dried/baked zeolite with a cobalt compound in solution;
   (c) drying said impregnated zeolite of step (b) to remove the solution in which the cobalt compound was impregnated from said impregnated zeolite; and
   (d) repeating steps (b) and (c), in order, at least one time.

2. The method of claim 1 wherein said dried/baked zeolite: comprises one or more pentacil-type zeolites, acidic aluminosilicate zeolites or synthetic analogs of mineral faujasite zeolites.

3. The method of claim 2 wherein said dried/baked zeolite is selected from Zeolite-Y and zeolite ZMS-5.

4. The method of claim 1 wherein the solution of said cobalt compound is an aqueous solution.

5. The method of claim 4 wherein said aqueous solution is a water solution.

6. The method of claim 1 wherein said cobalt compound is at least one of the groups consisting of: a cobalt salt, cobalt nitrate and cobalt nitrate hexahydrate.

7. The method of claim 1 wherein said drying step of step (c) comprises exposing the impregnated zeolite to an air stream.

8. The method of claim 7 wherein said air stream is at a temperature of between 200° C. and about 600° C.

9. The method of claim 8 wherein said air stream is at a temperature of between about 300° C. and about 500° C.

10. The method of claim 9 wherein said air stream is at a temperature of between about 350° C. and about 450° C.

11. The method of claim 1 wherein said drying step of step (c) comprises baking the impregnated Zeolite at a temperature of between 200° C. and about 600° C.

12. The method of claim 11 wherein said baking temperature is between about 300° C. and about 500° C.

13. The method of claim 12 wherein said baking temperature is between about 350° C. and about 450° C.

14. The method of claim 1 wherein said drying step of step (c) comprises drying the impregnated zeolite on a water bath at a temperature of between about 30° C. and about 100° C.

15. The method of claim 12 wherein said zeolite is exposed to said baking temperature for at least 3 hours.

16. The method of claim 12 wherein said zeolite is exposed to said baking temperature for at least 5 hours.

17. The method of claim 1 wherein the drying of the impregnated zeolite on a water bath occurs on a water bath having a temperature of between about 60° C. and about 80° C.

18. The method of claim 17 wherein said drying of said impregnated zeolite on said water bath is at least about 30 minutes.

19. The method of claim 17 wherein said drying of said impregnated zeolite on said water bath is at least about 1 hour.

20. A method for producing zeolite catalysts comprising in order the steps:
   (a) drying a zeolite in H-form for about at least 3 hours at about at a temperature of about 200° C. to about 600° C. under an air stream;
   (b) saturating the dried zeolite with an aqueous solution of cobalt nitrate hexahydrate;
   (c) drying the cobalt nitrate hexahydrate-saturated zeolite for about at least 3 hours at a temperature of about 200° C. to about 600° C. under an air stream;
   (d) re-saturating the zeolite of step (c) with said aqueous solution of cobalt nitrate hexahydrate; and
   (e) drying the cobalt nitrate hexahydrate-saturated zeolite for about at least 3 hours at a temperature of about 200° C. to about 600° C. under an air stream.

21. The method of claim 20 wherein the saturation steps produce a mass/mole ratio of between about 0.43 and 0.14 g/mole.

22. The method of claim 20 further including the step of: drying the saturated zeolite on a water bath at a temperature of between about 30° C. and about 100° C. for at least about 1 hour, such step being performed before or any or all of drying steps (c) or (e).

23. The method of claim 20 wherein the drying steps of (c) and (e) are conducted with an air stream at a temperature of between about 350 and about 450° C. for about 5 hours to produce a powder.

24. The method of claim 22 wherein the water bath temperature is maintained at about 60° C. for about 1 hour.

25. The method of claim 20 when the zeolite is Zeolite Y.

26. The method of claim 20 when the zeolite is Zeolite ZSM-5.

27. The method of claim 21 when the mass/mole ratio is about 0.43.

28. The method of claim 21 when the mass/mole ratio is about 0.22.

29. The method of claim 21 when the mass/mole ratio is about 0.14.

30. The Zeolite-Cobalt catalyst produced by the method of claim 20.

31. The Zeolite Y-Cobalt catalyst produced by the method of claim 25.

32. The Zeolite ZSM-5-Cobalt catalyst produced by the method of claim 26.

33. The Zeolite Y-Cobalt catalyst produced by the method of claim 27.

34. The Zeolite ZSM-5-Cobalt catalyst produced by the method of claim 28.

35. The Zeolite ZSM-5-Cobalt catalyst produced by the method of claim 29.

36. A method for producing synfuel comprising in order the steps:
    (a) obtaining a zeolite-cobalt catalyst made by the method of claim 1;
    (b) activating the zeolite catalyst by heating it in a flow reactor at a temperature of about 450° C., using a stream of hydrogen gas at about 1 atmospheric pressure with a volume velocity of about 3000 hour$^{-1}$;
    (c) stopping the hydrogen flow and reducing the temperature of the flow reactor to about 160° C.;
    (d) passing synthesis gas comprising CO/H$_2$ in the ratio of about through the reactor with a volume velocity of about 100 hour$^{-1}$;
    (e) raising the temperature of the flow reactor to about 200° C. over a period of about 5 hours;
    (f) collecting the gaseous and liquid products.

37. The method of claim 1 step (a) wherein the zeolite is dried/baked at a temperature of about 200° C. to about 600° C. for at least 3 hours under an air stream.

* * * * *

UNITED STATES PATENT AND TRADEMARK OFFICE
CERTIFICATE OF CORRECTION

PATENT NO. : 7,723,252 B2
APPLICATION NO. : 11/734006
DATED : May 25, 2010
INVENTOR(S) : Lapidus Albert Lvovich and Budtsov Vladimir Sergeevich It is certified that error appears in the above-identified patent and that said Letters Patent is hereby corrected as shown below:

Col. 3, Line 40, now reads:
"a saturating aqueous solution of a solue, such has cobalt" - should read:
-- a saturating aqueous solution of a solute, such as cobalt --

Col. 3, Line 51, now reads:
"liter = 2.0 g liter2/mole. The measure refers to these quantities" - should read:
-- liter = 2.0 (g•liter2)/mole. The measure refers to these quantities --

Claim 17, Col. 10, Line 44, now reads:
"having a temperature of between about 60°C and about 80°" - should read:
-- having a temperature between about 60°C and about 80° --

Claim 21, Col. 11, Line 2, now reads:
"produce a mass/mole ratio of between about 0.43 and 0.14" - should read:
-- produce a mass/mole ratio between about 0.43 and 0.14 --

Claim 22, Col. 11, Line 5, now reads:
"drying the saturated zeolite on a water bath at a temperature of" - should read:
-- drying the saturated zeolite on a water bath at a temperature --

Claim 23, Col. 11, Line 10, now reads:
"and (e) are conducted with an air stream at a temperature of" - should read:
-- and (e) are conducted with an air stream at a temperature --

Signed and Sealed this

Seventh Day of September, 2010

David J. Kappos
*Director of the United States Patent and Trademark Office*